United States Patent
Remaud

[15] 3,704,895
[45] Dec. 5, 1972

[54] TRIM-CORRECTING DEVICES FOR VEHICLES

[72] Inventor: Jacques Remaud, Billancourt, France

[73] Assignees: Regie Nationale des Usines Renault, Billancourt, France; Automobiles Peugeot, Paris, France

[22] Filed: Oct. 21, 1970

[21] Appl. No.: 82,696

[30] Foreign Application Priority Data

Oct. 24, 1969  France.....................36571
May 27, 1970  France.....................19419

[52] U.S. Cl..............................280/124 F, 267/65 D
[51] Int. Cl.............................................B60g 21/06
[58] Field of Search..................280/124 F; 267/65 D

[56] References Cited

UNITED STATES PATENTS

3,558,154  1/1971  Jackson.................280/124 F
3,002,765  10/1961  MacDuff................280/124 F

*Primary Examiner*—Philip Goodman
*Attorney*—Stevens, Davis, Miller & Mosher

[57] ABSTRACT

A trim-correcting device for automobile vehicles, in which each wheel suspension of at least one of the front or rear sets of wheels is coupled to the vehicle body through the intermediary of a hydraulic jack, while a detection device for the height of the chassis with respect to the ground, with a time-delay action, co-operates with means for supplying fluid under pressure to the jacks and with means for discharging said jacks, and a distributor for fluid under pressure is provided between the said supply means and the said jacks, characterized by the fact that the distributor of fluid under pressure comprises a control responsive to the differential state of the said jacks.

7 Claims, 9 Drawing Figures

TRIM-CORRECTING DEVICES FOR VEHICLES

The present invention relates to a trim-correcting device for vehicles intended to maintain the height of the vehicle body constant, independently of the load applied on the axle considered.

Trim-correcting devices are already known in which each wheel suspension of at least one of the front or rear sets of wheels is coupled to the body through the intermediary of a hydraulic jack, while a device for detecting the height of the chassis with respect to the ground co-operates in a time-delayed action with means for supplying fluid under pressure to the jacks and with means for emptying these latter, a distributor for fluid under pressure being provided between the said supply means and the jacks.

The invention is more particularly concerned with arrangements of a device of this kind, characterized essentially by the fact that the distributor for fluid under pressure comprises a control responsive to the differential state of the jacks in order to obtain a balanced trim correction on the wheels of a same set.

Furthermore, when it is desirable to utilize high-pressure jacks having a small travel and therefore capable of small volumetric variations, the liquid discharged must then be braked by means of calibrated throttling members which must be of extremely small size and which present technological problems of constructions, the solutions of which are costly and which lead of the acceptance of risks of choking necessitating special protection by filters.

The present invention also provides a solution for these problems, and is essentially characterized by the fact that the detection device is coupled to the supply and emptying means by a common control independent of that of the supply alone, so that for any correction for lowering of the trim of the vehicle, the supply and emptying means are simultaneously actuated, the throttling members being such that the emptying effect is preponderant.

Several forms of construction of a device according to the invention are described below by way of examples, reference being made to the accompanying drawings, in which.

Figures 1, 2:
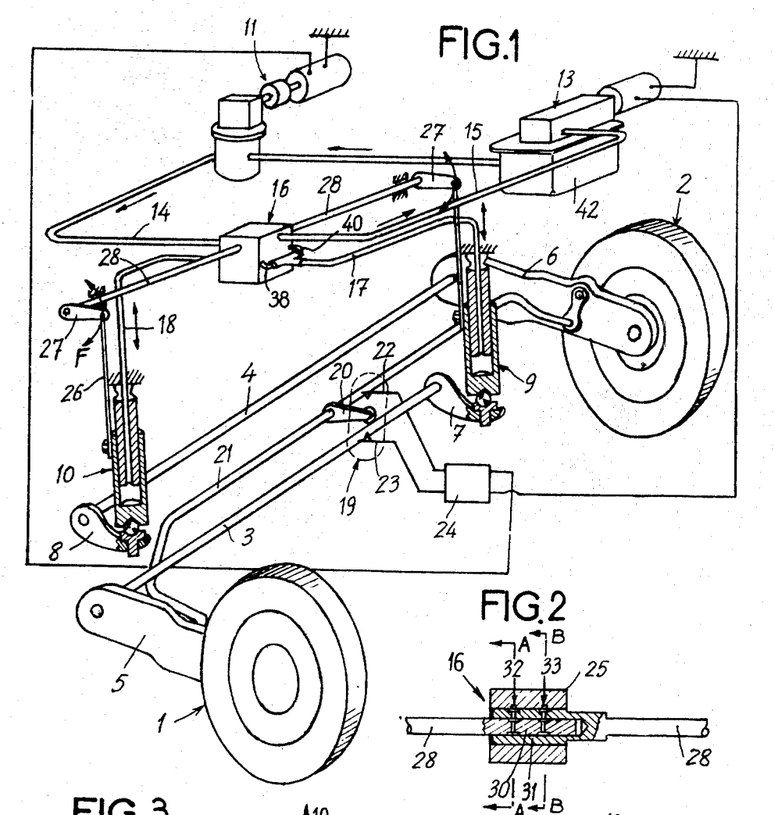
FIG. 1 is a diagrammatic view of a trim-correcting device according to the invention, applied to the rear set of a vehicle with independent wheels.
FIG. 2 is a section of the hydraulic distributor taken along the axis of its distribution members.

A trim-correcting device according to the invention is shown in FIG. 1 as applied to a rear set of wheels of a vehicle with independent wheels 1, 2, the suspension of which is of the torsion-bar type, comprising bars 3 and 4, one extremity of which is mounted fixed for rotation with the corresponding wheel arm 5 or 6, and the other extremities of which are anchored in levers 7, 8, the angular position of which is regulated by hydraulic jacks 9, 10 forming part of the trim-correcting device, the wheel arms and torsion bars being mounted on the body in the usual manner (not shown) in bearings located in the axis of these bars.

It will of course be understood that any other type of spring could be employed in combination with the trim-corrector according to the invention, and in particular any other metallic or pneumatic spring.

The supply of fluid to the jacks is ensured by means of a generator such as an electro-pump 11 while their discharge is effected by means of an electro-valve 13 coupled respectively by conduits 14 and 15 to a distributor 16 in turn connected to the jacks 9, 10 by the conduits 17, 18.

These operations are controlled by a detector 19 of the height of the body with respect to the ground, as a function of the instantaneous position of the said body with respect to a pre-determined reference height, shown in this case in a manner known per se by a reference mark 20 fixed to the center of the anti-roll rod 21 of the wheel set, so that its angular position represents the mean height of the two wheel suspensions considered.

The reference mark 20 co-operates electrically with two contacts 22, 23 arranged on each side of it and fixedly mounted with respect to the body in a position determining the normal static height of the whole of the suspension, for which the reference mark is in a position intermediate between the contacts 22, 23. When a contact is established between the reference 20 and the contact 22, a signal is emitted and sent to the electro-pump 11. If the contact is made between the reference 20 and the contact 23, a signal is sent to the electro-valve 13.

These signals are time-delayed by a device 24, known per se, so that the actuation of the electro-pump or of the electro-valve is only effected for a signal which persists in time for a period of about 10 seconds, thus avoiding their unnecessary actuation in response to oscillations of the suspension while running or during accelerations or braking actions.

The detection and time-delay devices complying with the above conditions may be for example such as those described in the U.S. patent application Ser. No. 728,623 of May 13, 1968 now U.S. Pat. No. 3,589,700. Other electrical, electronic or thermal devices may however be equally suitable.

The distributor 16 for the flow of fluid under pressure, the body 25 of which is fixedly mounted on the body of the vehicle, comprises internal distribution members controlled by the variations in position of the jacks 9, 10 through the intermediary of rod systems comprising, from each jack, a rod 26 rigidly fixed to the moving jack cylinder with respect to the piston fixed on the vehicle body, and a crank-arm 27, keyed on a rod 28 rotatably mounted on the vehicle body and with respect to the distributor body, in which it forms or carries an internal distribution member.

These distribution members comprise a core 30 rigidly fixed to the rod 28 coupled to the jack 10, and a rotor 31 rigidly fixed to the rod 28 coupled to the jack 9, the core and the rotor being rotatably adjusted one with respect to the other, as is also the rotor in the body 25.

The core 30 and the rotor 31 have two corresponding radial fluid-passage zones, spaced apart axially and indicated by 32 and 33 on the drawing.

In each of these zones, the rotor 31 has three flats formed at 120°, each pierced at their middle portions with a channel (channels 50, 51, 52 in the zone 32, and channels 53, 54, 55 in zone 33) forming communications between the cavities 34 comprised between the body 26 and the flats of the rotor on the one hand, and the cavities 35 on the other hand, formed by the internal cylindrical cavity of the rotor with the core 30, which is provided in these zones with two parallel flats.

Figure 3:
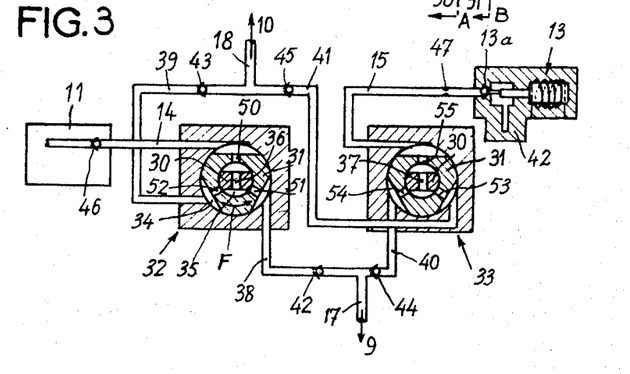
FIG. 3 is a general hydraulic diagram of the device with a cross-section of the distributor along the line A—A of FIG. 2 (on the left) and along the line B—B of FIG. 2 (on the right)

The cavities 35 can also communicate with each other by means of the conduits 36 (zone 32) and 37 (zone 33) pierced in the core 30, so that for the relative positions of the core 30 and the rotor 31 as shown in FIG. 3, if the zone 32 is considered, the fluid arriving from the pump 11 through the conduit 14 can pass through the conduits 38, 39 to the conduits 17 and 18 opening into the jacks 9, 10, and if the zone 33 is considered, in the same manner the fluid coming from the jacks 9, 10 through the conduits 7, 18 and the conduits 40, 41, can reach the conduit 15 coupled by the electro-valve 13 to the tank 42 of the hydraulic installation.

On the conduits 38, 39, 40 and 41 are mounted non-return valves 42, 43, 44 and 45, while a non-return valve 46 is also mounted on the delivery of the pump and a throttling device 47 intended to brake the discharge of the jacks is mounted on the conduit 15.

The operation of the device previously described is as follows:

There will first be considered the case in which the vehicle while stopped has just been overloaded, the body moving down below the pre-determined height referred to above. In this case, an electrical connection is established between the reference 20 and the contact 22, and a signal is sent to the electro-pump 11, which will be actuated at the end of the time-delay period effected by the device 24.

The fluid under pressure, in the present case mineral oil, is led through the conduit 14 into the zone 32 of the distributor 16 from which it follows the channels 50, 36 and 51, 52, and is led through the conduits 38–17 and 39–18 into the jacks 9 and 10, passing through the non-return valves 42 and 43.

The jacks 9–10 thus cause the torsion bars 3,4 to pivot by pushing on the anchorage levers 7 and 8, thereby ensuring the restoration of the trim of the vehicle, the body of which is raised up to the normal pre-determined value for which the contact between the elements 20 and 22 is again interrupted, the action of the pump then being immediately stopped.

In this position, the oil contained in the jacks is blocked by the non-return valves 42 and 43, and the passage which it could have found through the zone 33 is blocked by the valve 13a of the electro-valve 13, which is in the closed position.

In the case where the vehicle has just been unloaded, the body lifts above the pre-determined height fixed.

In this case, the reference 20 and the contact 23 come into electrical contact and a signal is sent to the electro-valve 13, which is actuated at the end of the time-delay period ensured by the device 24. The excess oil contained in the jacks 9 and 10 can return to the tank 42 by following the path passing through the conduits 40, 41, valves 44, 45, channels 53, 54, 37, 55 and the conduit 15 freed by the valve 13a of the electro-valve is in the open position.

In the case where the vehicle is unsymmetrically loaded, for example in an excessive manner on the left-hand side, the result will first be that as the body is too low, the electro-pump will be actuated as previously described.

However, the torsion of the suspension bar 3 of the left-hand wheel, which is greater than the torsion of the other bar 4 due to the existence of a greater load on the left of the body than on the right, will result in an excess pressure of oil contained in the jack 9 as compared with the pressure existing in the jack 10, the valves 42 and 45 then ensuring the separation between these two pressure levels.

For this reason, the oil delivered by the electro-pump 11 will be initially admitted, from the distributor, to the jack 10 at the lowest pressure through the channels 50, 36, 52 and the conduit 39, which will tend to accentuate still further the unbalance of the rear set of wheels. However, due to the action of the oil which it receives, the jack 10 is extended so as to cause, through the intermediary of the rod system 26, 27, rotation of the core 30 in the direction of the arrow F, the rotor remaining fixed.

This rotation results in a throttling by the core 30 of the channel 52 by which the jack 10 is fed. From this point, the distributor 16 operates as a "follower system," the two jacks being extended together, since when the core closes the channel 52, only the jack 9 can then be fed through the channel 51, its extension resulting, through the corresponding rod system 26, 27, in the rotation of the rotor in the previously defined direction F, which re-opens the supply channel 52 of the jack and so on until the reference 20 moves away from the contact 22 and consequently the electro-pump 11 is stopped, which means that the body is brought back to the said mean predetermined height.

Figures 4, 5:
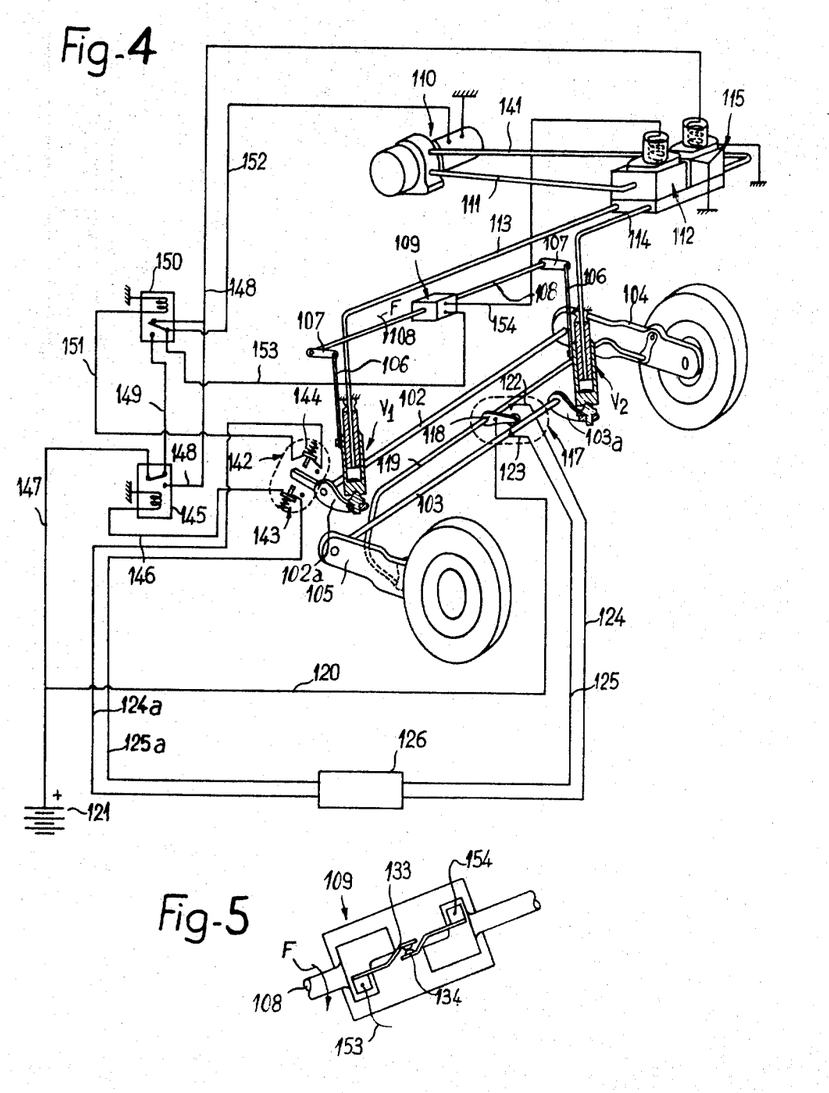
FIG. 4 is a diagram of another corrector device according to the invention, comprising a hydraulic distributor with electro-magnetic control.
FIG. 5 shows in detail the respective position detector of the hydraulic jacks.

The construction shown in FIG. 4 relates to a rear suspension of a vehicle body by torsion bars 102 and 103, respectively coupled to the suspension arms 104, 105 of the right-hand and left-hand wheels at one of their extremities. At their other extremity, these bars are provided with levers 102a, 103a, with which co-operate the cylinders of the hydraulic height-correcting jacks $V_1$ and $V_2$, the pistons of which are fixed on the vehicle body. The wheel arms and torsion bars are mounted on the body in the usual manner (not shown) in bearings located in the axis of these bars. The cylinders carry rods 106 coupled to crank-arms 107 co-operating with rods 108 which pass into a detector 109 of the respective positions of the jacks $V_1$, $V_2$.

The supply to the jacks is effected by means of a source of fluid under pressure, such as an electro-pump 110, in this case connected by a conduit 111 to a distributor 112 coupled to the jacks $V_1$ and $V_2$ by separate external conduits 113 and 114.

The discharge of the jacks is effected by means of an electro-valve 115, to which the jacks are connected by the external conduits 113 and 114, coupled to internal conduits 116a, 116b, which are common to the distributor and the electro-valve, as will be explained later.

These operations are controlled by a detector 117 of the height of the body with respect to the ground, of an electrical type consisting, in a manner known per se, of a reference conduit 118 fixed to the center of an anti-roll bar 119 of the set of wheels considered, and connected by the conductor 120 to the positive pole of a battery 121, this contact 118 co-operating with two contacts 122 and 123 arranged on each side of the reference contact and mounted on the vehicle body in a position which determines the normal static height of the whole of the suspension for which the reference contact 118 is separated from both the other contacts.

When the contact is made between the contacts 118 and 122, a signal is sent to the electro-pump 10 over the conductor 124, while if the contacts 118 and 123 are joined, a signal is sent to the electro-valve 115 and also to the electro-pump 110 over the conductor 125.

As previously, these signals are time-delayed by a device 126, known per se, in such manner that they only become active after a period of time, of the order of 10 seconds for example, thus preventing unnecessary actuation of the electro-pump and the electro-valve in response to oscillations of the suspension during operation, during accelerations or braking actions.

Figures 6, 7:
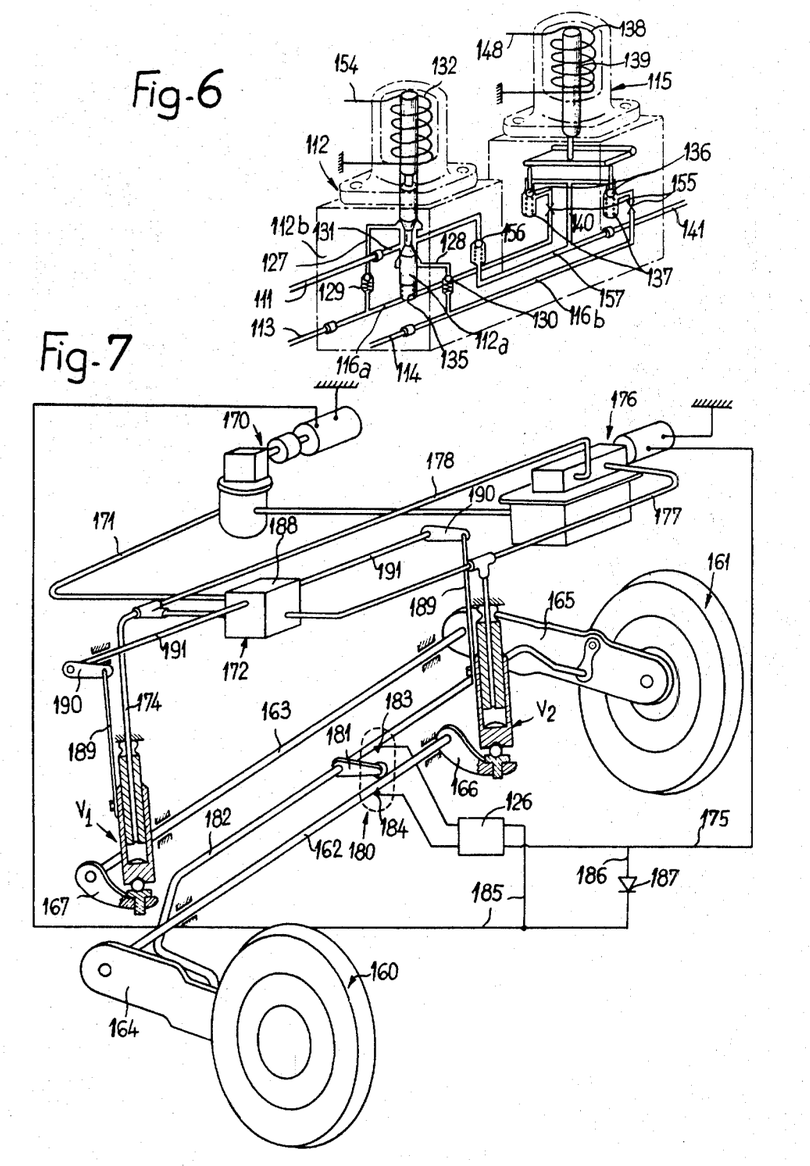
FIG. 6 is a detail view of the assembly formed by the fluid distributor and the electro-valve, together with their connections.
FIG. 7 is a diagrammatic view of another corrector device according to the invention applied to a rear set of wheels of a vehicle having independent wheels, with a hydraulic distributor of the mechanical type.

The distributor 112 comprises a moving distribution slide-valve 112a co-operating with a fixed body 112b provided with two internal conduits 127, 128, respectively coupled to the conduits 116a and 116b communicating with the jacks and provided with non-return valves 129, 130. The body 112b comprises a conduit 131 supplied by the conduit 111 and which is put into communication with one or the other of the conduits 127, 128, the slide-valve 112a being placed for that purpose under the control of an electro-magnet 132, the excitation of which is effected by an electric contact actuated by the differential state of the jacks $V_1$, $V_2$, and constituted by two moving elements 133, 134 located in the detector 109, respectively fixed to the cylinders of the jacks by means of rods 108 movable in rotation and displaced with respect to the axes of these latter, so that their respective movements follow an arc of a circle.

When this contact is open (which occurs when the cylinder volume of the jack $V_1$ is less than that of the jack $V_2$), a restoring spring 135 urges the slide-valve 112a into the position shown in FIG. 3 (conduits 131 and 127 in communication and therefore 111, 113 and jack $V_1$), and when it is closed, which occurs when the cylinder volume of $V_1$ is greater than that of $V_2$, the electro-magnet 132 is excited and drives the slide-valve 112a into its other extreme position, for which the conduits 131 and 128 are put into communication (and therefore 111, 114 and the jack $V_2$).

The electro-valve 15 comprises two clapper-valves 136 urged by springs 137 into the position at which they close passages in which terminate the conduits 116a and 116b, but which can open these passages when the control solenoid 138 is excited, the core 139 then moving the valves against the force of the springs, so that the conduits 116a and 116b are in this case connected through the valves and by a common conduit 140 to an exhaust collector conduit 141 which returns to the pump.

There will further be observed the existence in the electric circuit connecting these various members:

of a travel limiter 142 for the jack $V_1$ (the jack $V_2$ also having a similar limiter, not shown, to simplify the drawing), comprising two contact breakers 143 and 144, closed by the action of springs in normal operation, coupled to the time-delay device 126 by the conductors 124a, 125a, and breaking the current when the cylinder of the jack $V_1$ reaches its end position, by the action of an extension of the lever 102a fast for rotation with the extremity of the torsion bar 102;

of a control relay 145 for the emptying electro-valve 115, the coil of which is connected by the conductor 146 to the contact breaker 143, and being able to establish contact between a conductor 147 connected to the positive pole of the battery 121 and one of the two conductors 148 and 149;

of a control relay 150 for the electro-pump 110, the coil of which is connected by the conductor 151 to the contact-breaker 144 and joining a conductor 152 coupled to the electro-pump and 153 coupled to the detector 109, to one of the conductors 148 or 149.

The operation of this device is as follows:

There will first be considered the case where the vehicle is stopped and has just been overloaded, thus moving down below the pre-determined height referred to above. In this case, the reference contact 118 touches the contact 122 and a control signal is sent to the electro-pump 110, which will be actuated at the end of the time-delay period ensured by the device 126, through the conductors 124, 124a, the contact-breaker 144, the conductor 151 and the coil of the control relay 150, the excitation of which brings the moving contact into connection with the conductor 149 and then connects the battery 121 through the relay 145 to the conductors 152 and 153.

On the other hand this actuates the electro-pump 110 while on the other it puts under positive tension the contact element 133 of the position detector 109, the element 134 of which is connected to the negative pole by the conductor 154 and the solenoid of the electro-magnet 132. According to the differential state of the jacks $V_1$ and $V_2$, the elements 133, 134 are in contact or not. If for example the cylinder volume of the jacks $V_1$ is less than that of the jack $V_2$, the elements 133, 134 are not in contact and do not excite the control electro-magnet 132 of the distributor 112. At that moment, the oil under pressure will be directed through the conduits 111, 131, 127, 116a and 113 towards the jack $V_1$.

The filling of this jack $V_1$ will continue until its cylinder volume reaches that of the jack $V_2$ and during the course of this operation, the rod system 106, 107 and 108 drives the contact element 133 in the direction F to bring it towards the contact element 134, which it meets and with which it remains in contact when the cylinder volume of the jack $V_1$ reaches and exceeds that of the jack $V_2$ before the interruption of its supply. In fact, when the elements 133 and 134 come into contact, they close the excitation circuit of the electro-magnet 132 controlling the distributor 112, which causes the slide-valve 112a to move down and thus puts into communication the conduits 111, 131, 128, 116b and 114 which supply the jack $V_2$, up to the re-opening of the contact 133, 134 following the reverse procedure to that described above. These distribution operations will be reproduced alternately and will thus equalize the filling of the jacks until the contact 118 of the detector 117 leaves the contact 122, which interrupts the supply of voltage to the electro-pump 110, the vehicle body being then brought back to its pre-determined level, the non-return valves 129–130 ensuring the maintenance of the new cylinder volume of the jacks. A clapper-valve 156 for discharging the electro-pump when so required is provided so as then to connect the conduit 131 to the exhaust manifold 141 by a conduit 157.

In the case where the vehicle when stopped has just been unloaded, the vehicle body rises above its pre-determined height and the contact 118 touches the contact 123. A control signal is emitted and sent through the conductor 125 of the time-delay device 126, the contact 143 of the travel limiter 142 and the coil of the control relay 145, the excitation of which brings the moving contact to join the conductors 147 and 148.

The solenoid 138 of the emptying electro-valve 115 is excited through the conductor 148, and simultaneously, the electro-pump 110 is actuated by the moving contact at rest of the relay 150 and through the conductor 152, while the element 133 of the detector 109 is put under tension by the conductor 153.

Through the electro-valve 115, the clappers 136 of which are then open, the excess oil contained in the jacks $V_1$ and $V_2$ returns to the tank of the installation, passing through the throttling devices 155, then the clappers 136 and the conduits 140–141.

If the jack $V_1$ initially contains a cylinder oil volume lower than that of the jack $V_2$, or if it is initially discharged faster than this latter, the contact 133–134 will be opened and the distributor 112 will put the conduit 131 into communication with the conduit 127 and therefore with the jack $V_1$, so that the flow-rate of the electro-pump 110 which supplies this latter alone, brakes its emptying speed.

The jack $V_2$ will then in its turn be discharged more rapidly than the jack $V_1$, until the contact 133, 134 closes on the equalization of the cylinder volumes. The solenoid 132 is therefore excited and moves the slide-valve 112a of the distributor into the position at which the conduit 131 is put into communication with the conduit 128, the electro-pump 110 then delivering only into the jack $V_2$, the emptying speed of which will then be braked in its turn with respect to that of the jack $V_1$.

These alternate operations are thus reproduced until the contact 118 of the height detector 117 leaves the contact 123, which interrupts the voltage supply to the electro-pump 110 and the excitation of the electro-valve 115, the vehicle body being then brought back to its pre-determined level.

It will be recalled that the contact breakers 143, 144 respectively form emptying and filling limiting devices for the jacks at pre-determined extreme cylinder volumes.

Figure 8:
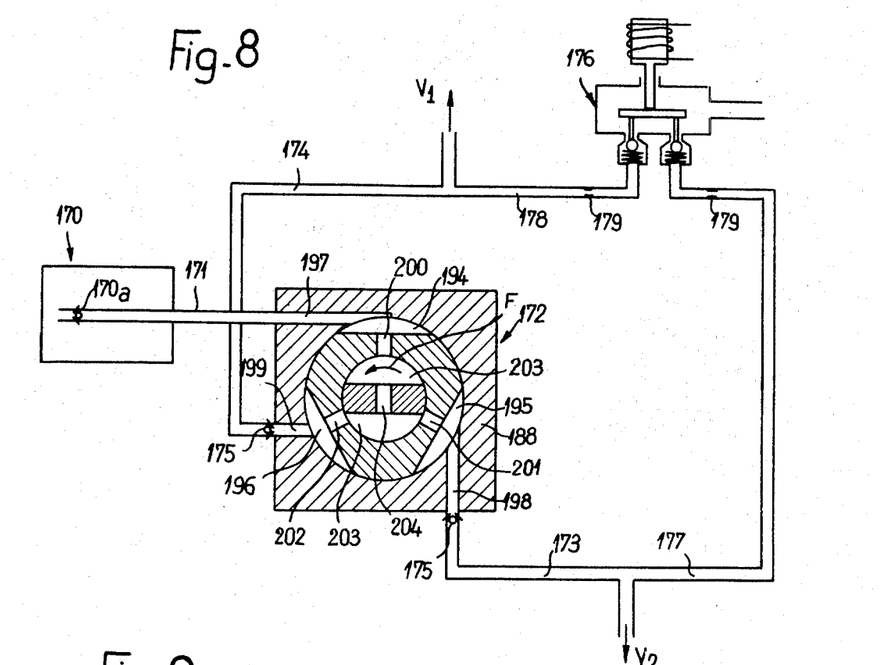
FIG. 8 is a diagrammatic view of the hydraulic circuit of the device shown in FIG. 7, with a cross-section of the distributor taken along the line VIII—VIII of FIG. 9.

FIGS. 7 and 8 illustrate another form of construction of the corrector device according to the invention, utilizing a distributor of the mechanical control type.

This embodiment is shown, as previously, applied to a rear set of vehicle wheels having independent wheels 160, 161, the suspension of which is of the torsion-bar type, comprising bars 162 and 163 of which one extremity is mounted fixed for rotation with the corresponding wheel arm 164 or 165, and the other extremities of which are anchored in the levers 166, 167, the angular position of which is regulated by trim-correcting hydraulic jacks $V_2$, $V_1$. The wheel arms and torsion bars are mounted on the vehicle body in the usual manner (not shown) in bearings located in the axis of these bars.

The supply to the jacks $V_2$, $V_1$ is effected by means of an electro-pump 170 coupled through a non-return valve 170a and by a conduit 171 to a distributor 172, in turn connected to the jacks by separate conduits 173, 174 provided with non-return valves 175.

The jacks are also coupled to an emptying electro-valve 176 by the conduits 177, 178, each provided with a throttling device 179.

A height detector 180 of the body with respect to the ground is composed in known manner by a reference contact 181 fixed to the center of an anti-roll rod 182 of the set of wheels. This contact 181 co-operates electrically with two contacts 183, 184 fixed to the vehicle body as in the case of the previous detector 117. Similarly, the signals emitted by this detector are time-delayed by a device 126 similar to the previous device and having exactly the same purpose.

When contact is made between the contacts 181 and 183, a signal is sent to the electro-pump 170 through the conductor 185, and if it is established between the contacts 181 and 184, a signal is sent to the electro-valve 176 through the conductor 175 and also to the electro-pump by a branch circuit 186 coupled to the conductor 175 and comprising a diode 187 which prevents the undesirable passage of any signal coming from the conductor 185.

Figure 9:
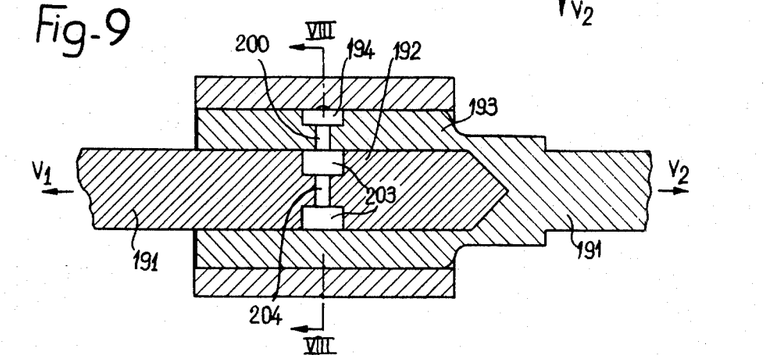
FIG. 9 is a view in axial section of the distributor shown in FIG. 7.

The distributor 172, the body 188 of which is fixedly mounted on the vehicle body, comprises rotating internal distribution members subjected to the variations of state of the jacks $V_2$, $V_1$ through the intermediary of rod systems comprising, from each jack, a rod 189 fixed to the jack cylinder moving with respect to the piston fixed on the vehicle body, and a crank-arm 190 keyed on a rod 191 rotatably mounted on the vehicle body with respect to the distributor, in which it forms or carries an internal distribution member.

These distribution members comprise a core 192 rigidly fixed to the rod 191 coupled to the jack $V_1$ and a rotor 193 rigidly fixed to the rod 191 coupled to the jack $V_2$, the core and the rotor being adjustably rotatable with respect to each other. The body 188, the rotor 193 and the core 192 are provided with corresponding fluid passages which comprise three cavities 194, 195, 196 formed between the body 188 and three flats formed at 120 on the rotor, these cavities communicating respectively by means of the passages 197, 198, 199 formed in the body 188, with the conduit 171 connected to the electro-pump, with the conduit 173 connected to the jack $V_2$ and with the conduit 174 connected to the jack $V_1$.

In the center of its flats, the rotor is provided with radial channels 200, 201, 202 by which the cavities 194, 195, 196 can be put in intercommunication through the intermediary of two cavities 203 formed in the rotor by two parallel flats of the core 192, with a central intercommunication channel 204.

The operation of this device is as follows:

There will first be considered the case in which the vehicle when stopped, has just been overloaded, the vehicle body being forced down below its pre-determined height. In this case, the reference 183 touches the contact 181 and the electro-pump will be actuated at the end of the time-delay period determined by the device 126. The oil under pressure is then delivered by the pump through the above-mentioned intercommunicating passages of the distributor 172, into the jacks $V_1$, $V_2$, the filling of which ensures the return of the vehicle to its correct trim, until the contact between the reference 181 and the contact 183 is again broken.

If, for this restoration of trim, the vehicle is non-symmetrically loaded, for example with excessive weight on the left-hand side, the torsion of the suspension bar 162 of the left-hand wheel is greater than that of the bar 163 and will cause an excess pressure of oil contained in the jack $V_2$, with respect to that existing in the jack $V_1$. For this reason, the oil coming from the electro-pump will first be admitted to the jack $V_1$ having the lower pressure, this jack will extend, thereby effecting, through the intermediary of the rod system 189, 190, 191, a rotation of the core 192 in the direction of the arrow F, the rotor 193 remaining fixed. This rotation causes a throttling through the core 192 of the channel 202 through which the jack $V_1$ is supplied. From this point onwards, the distributor operates as a follower system, the two jacks being extended together.

In fact, when the core blocks the channel 202, only the jack $V_2$ can then be fed through the channel 201, its extension resulting, through the rod system 189, 190, 191 in a rotation of the rotor in the direction F, which re-opens the supply channel 202 of the other jack, and so on during the whole period of trim correction.

In the case where the vehicle, when stopped, has just been unloaded, the vehicle body rises above its predetermined height and the reference 191 touches the contact 184, so that the electro-pump 170 and the electro-valve 176 will be actuated simultaneously at the end of the time-delay period ensured by the device 126. The excess oil contained in the jacks returns to the tank of the installation, passing through the throttling devices 179 and the electro-valve.

Starting from a substantially identical condition of the jacks $V_1$, $V_2$, the electro-pump supplies both of them through the channel of the distributor 172, thus braking their speed of discharge. However, in addition, if one of the jacks, the jack $V_2$ for example, is discharged more rapidly than the other jack $V_1$, the rotor 193 of the distributor coupled to the jack $V_2$ will be displaced in the opposite direction to the arrow F with respect to the core 192 coupled to the other jack.

The result is that the supply channel 201 of the jack $V_2$ will be opened more while the supply channel 202 of the jack $V_1$ will be closed, that is to say a discharge correcting effect is obtained in that the speed of discharge of the jack which tends to discharge more rapidly is braked, while that of the other is increased, and this occurs in successive inversions so as to prevent any appreciable unbalance in the discharge between the two jacks of the same set of wheels.

What is claimed is:

1. A trim-correcting device for automobile vehicles having a chassis and body, comprising:
   a hydraulic jack coupling each wheel suspension of at least one of the front or rear sets of wheels to the vehicle body;
   means for supplying fluid under pressure to each jack;
   means for discharging fluid from each jack;
   a time-delay action detection device for determining the height of the chassis with respect to the ground, said detection device cooperating with said supplying means and said discharging means;
   means for distributing fluid under pressure to each jack in response to the differential position of said jacks;
   throttling members for the discharge flow from the jacks;
   a common control independent of that of the supply alone, coupling the detection device to the supplying means and discharge means, for simultaneously actuating said supplying and discharge means to correctly lower the trim of the vehicle.

2. A trim-correcting device for automobile vehicles having a chassis, comprising:
   a hydraulic jack coupling each wheel suspension of at least one of the front or rear sets of wheels to the vehicle body;
   means for supplying fluid under pressure to each jack;
   means for discharging fluid from each jack;
   a time-delay action detection devices for determining the height of the chassis with respect to the ground, said detection device cooperating with said supplying means and said discharging means;
   means for distributing fluid under pressure to each jack in response to the differential position of said jacks; wherein the distributing means comprises, in a body fixed on the body of the vehicle, two concentric distribution members, a core and a rotor, rotatable with respect to each other and respectively connected by a rod system to the parts which are movable with respect to the body of each jack of the set of wheels considered, these members and the distributor body forming two zones of radial distribution passages spaced apart axially, each of which constitutes a three-way distributor, the first zone comprising an inlet channel coupled to a source of supply of fluid under pressure placed under the control of the said time-delayed detection device, and an outlet channel coupled to each jack, the second zone comprising two inlet channels connected to the jacks and an outlet channel connected to a discharge valve for the jacks, placed under the control of the said time-delayed detection device, the arrangement of the core and the rotor being such that any angular displacement of one with respect to the other, corresponding to a different condition of load on the wheel suspensions of the set of wheels, tends to close one of the said channels connected to one of the jacks and to open the other, non-return valves being provided between the outlet channels of the first zone and the jacks and between the jacks and the inlet channels of the second zone.

3. A trim-correcting device as claimed in claim 2, characterized in that, in each of the said zones of the distributing means, the rotor forms with the body three angularly-spaced cavities into which the said three channels deliver, and has three conduits for providing communication of these cavities with two intercommunicating cavities formed between the core and the rotor, one of the said intercommunicating cavities overlapping two of the said conduits of the rotor which correspond to the two channels connected to the jacks, for equalizing the load of the wheel suspensions of the set of wheels.

4. A trim-corrector device for automobile vehicles having a chassis and body, comprising:
a hydraulic jack coupling each wheel suspension of at least one of the front or rear sets of wheels to the vehicle body;
means for supplying fluid under pressure to each jack;
means for discharging fluid from each jack;
a time-delay action detection device for determining the height of the chassis with respect to the ground, said detection device cooperating with said supplying means and said discharging means;
means for distributing fluid under pressure to each jack in response to the differential position of said jacks; wherein the distributing means comprises, in a body fixed on the vehicle body, two concentric distribution members forming a rotor and an interior core rotatably mounted with respect to each other, a control means for said distributing means comprising, for each of said distribution members, an angular-positioning rod system coupling said member to a part of the corresponding jack movable with respect to the vehicle body, said members and the distributor body constituting a three-way distributor comprising one inlet channel coupled to the supply means and two outlet channels coupled to said jacks, the arrangement of the distribution passages between the core and the rotor being such that any angular displacement of one with respect to the other corresponding to the differential state of the jacks tends, upon discharge, to close the supply channel of the jack which tends to be discharged less rapidly, the supply channel of the jack which tends to be discharged more rapidly, remaining open.

5. A trim-correcting device as claimed in claim 1, characterized in that the distributing means comprises a distribution unit for ensuring selective supply to the jacks, said unit comprising an electro-magnetic control with an electric detection contact for determining the differential condition of the jacks.

6. A trim-correcting device as claimed in claim 5, characterized in that the said electric detection contact for determining the differential state of the jacks comprises two co-operating elements respectively fixed to an angular positioning rod system which couples them to a corresponding part of the jack, movable with respect to the vehicle body.

7. A trim-corrector device as claimed in claim 5, characterized in that it comprises, for each jack, two electric contact breakers actuatable for pre-determined extreme cylinder volumes, the contact-breaker assemblies co-operating with two relays effecting the control of the supply and discharge means in dependence on the height-detection device.

* * * * *